United States Patent [19]

Crew

[11] Patent Number: 4,619,193
[45] Date of Patent: Oct. 28, 1986

[54] STANDING TREE BALER

[76] Inventor: Gerald W. Crew, 22399 S. Spring Creek Rd., Estacada, Oreg. 97023

[21] Appl. No.: 717,642

[22] Filed: Mar. 29, 1985

[51] Int. Cl.$^4$ ............................................. B65B 13/20
[52] U.S. Cl. ..................................... 100/13; 47/1 R; 53/530; 100/27
[58] Field of Search ......................... 100/3, 8, 13, 27; 53/439, 529, 530, 576, 589; 47/1 R, 58, 3, 4

[56] References Cited

U.S. PATENT DOCUMENTS

| | | | |
|---|---|---|---|
| 1,877,548 | 9/1932 | Brimer | 100/27 |
| 2,797,634 | 7/1957 | Rueckert | 100/13 |
| 2,974,457 | 3/1961 | Saxton | 100/13 |
| 3,015,187 | 1/1962 | Grether | 47/4 |
| 3,747,293 | 7/1973 | Van Slooten | 53/530 X |

OTHER PUBLICATIONS

"Northwest Lookout," Sep. 1983, Advertisements for Tree Balers: p. 39, North Star Evergreens, Inc., Eastwood Plaza Building, Box 253, Park Rapids, Minnesota 56470; p. 42, Wal-Del Products, sold through O. H. Shelton & Sons, 635-84th La., N.W., Coon Rapids, Minnesota 55433; p 47, Howey Tree Baler Corporation, Merritt, Michigan 49667.

Primary Examiner—Billy J. Wilhite
Attorney, Agent, or Firm—Klarquist, Sparkman, Campbell, Leigh & Whinston

[57] ABSTRACT

The invention includes a method and apparatus for baling a standing tree in situ. An adjustable tree collar is placed around the tree trunk below the tree branches. The collar is then raised along the trunk to press the branches inward toward the trunk. As the branches are pressed inward, they are bundled to the trunk. The collar is variable in size, being adapted to expand and pass downward over the tree branches to contract below the branches to encircle the tree trunk. It comprises a plurality of yoke members that are urged apart to straddle the tree and then drawn together below the extended branches to encircle the tree at the tree handle. The yoke members are mounted on a hoist which lowers them over the tree and then raises them along the trunk of the tree. A twine dispenser including a twine canister and a feed boom are rotatably mounted adjacent the yoke members to wrap twine around the pressed branches as the members are raised along the trunk to bundle the branches to the trunk.

13 Claims, 8 Drawing Figures

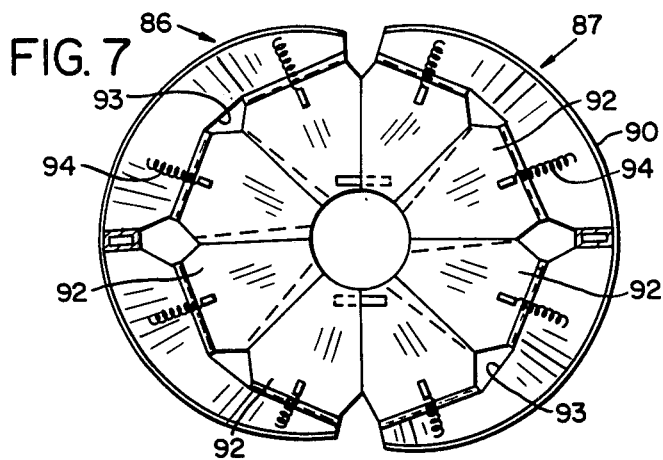
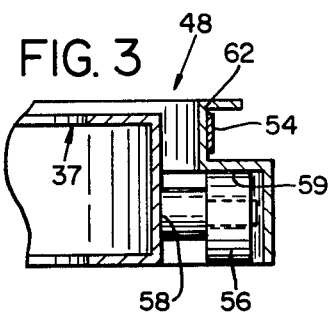
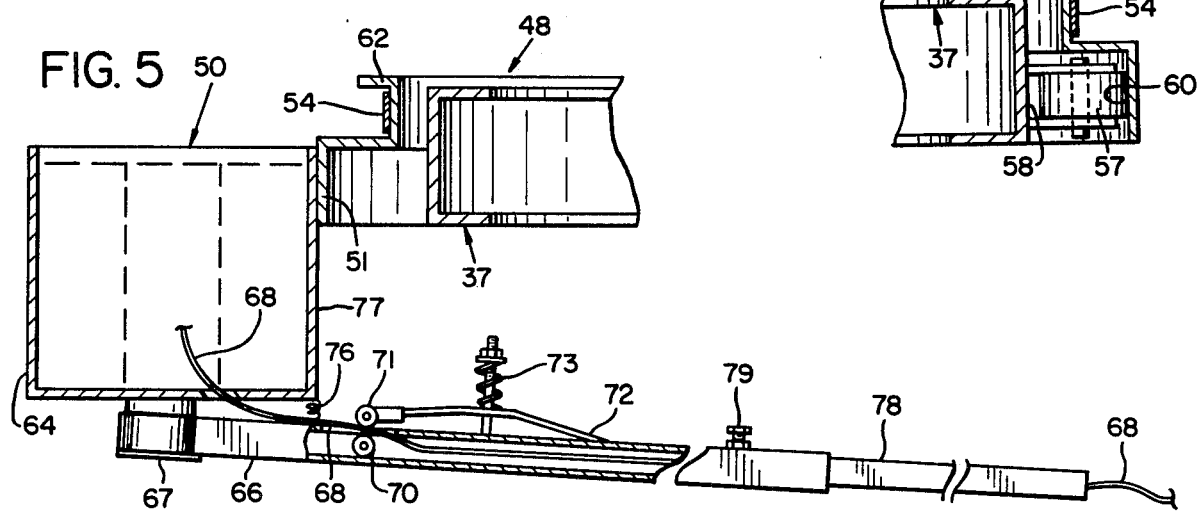
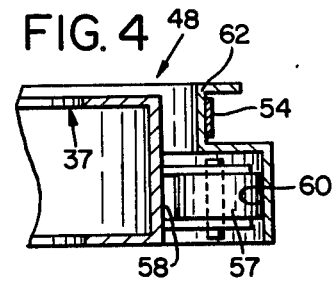
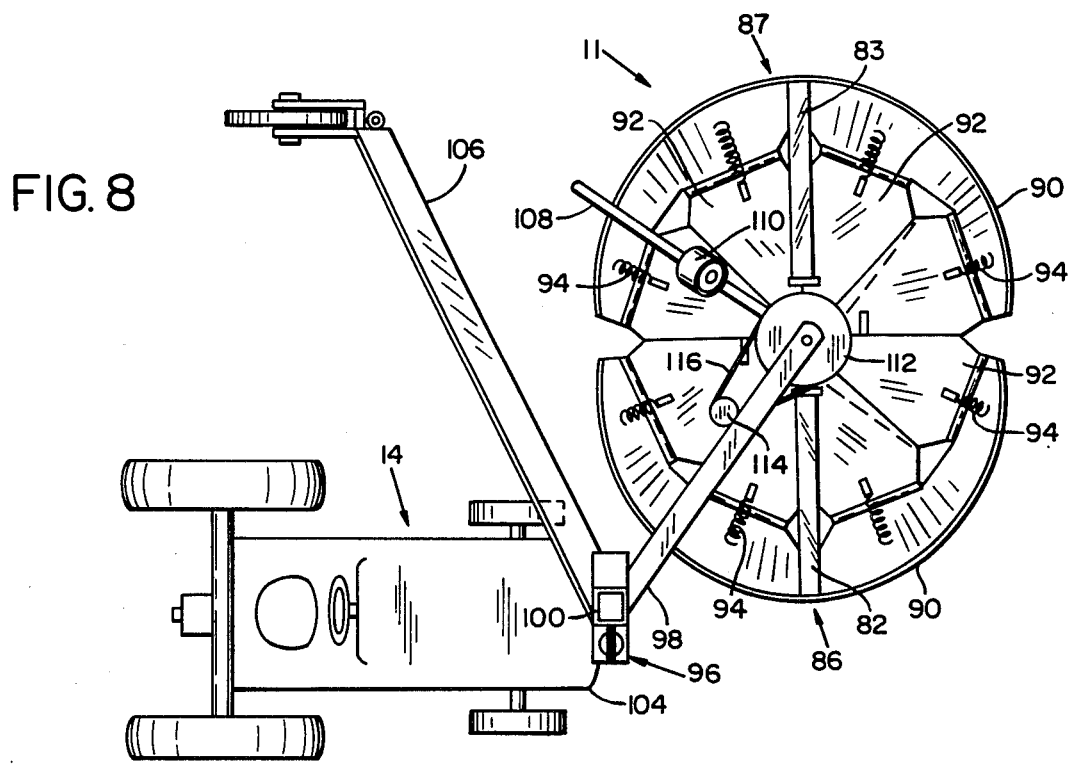

STANDING TREE BALER

BACKGROUND OF THE INVENTION

This invention relates generally to tree-baling apparatus and, more particularly, to a method and apparatus for baling a tree while it is still standing.

Tree baling is the process of bundling the extended branches of a tree tightly to its trunk to compress the tree's girth. The branches are pressed inward until they are roughly parallel to the trunk and then baling twine is wrapped around them to hold them in place. Baling is common in the Christmas tree and tree nursery industries, where trees are shipped for replanting with their branches and leaves still attached. It permits the trees to be packed more densely for shipping and facilitates their handling. Baled trees are also less likely to be damaged in transit because their branches are bundled together. Trees shipped with their branches extended, by contrast, are easily damaged because the branches intertwine with those of other trees, scraping the bark from the tree and knocking off leaves and needles.

The conventional method for baling Christmas trees is to fell them, haul them to a baler, and then bale them. The baler usually comprises a horizontally mounted variable-diameter cone or funnel. The tree is inserted into the cone with its lower trunk, or handle, first. A cable extending through the cone is then attached to the handle and actuated to pull the tree through the cone. As the tree passes through, the cone contracts around the trunk to bend the branches inward to the trunk. A mechanism associated with the cone wraps twine around the pressed branches to bundle them to the trunk.

Balers using this method are presently available from a number of sources. Manufacturers include the Howey Tree Baler Corporation of Merritt, Mich., Wall-Dell Products, and Northstar Evergreens, Inc., of Park Rapids, Minn. Although balers differ somewhat in design and operation, generally the method they employ is the same. The tree is first cut, then hauled to the baler, and loaded handle first into the cone. The tree is then pulled through the cone to press the branches inward to the trunk as baling twine is wrapped around the branches.

This method suffers from a number of disadvantages. Its primary drawback is that it cannot bale trees in their natural standing state, i.e., in situ. Nursery stock or trees intended for replanting, for example, cannot be cut and hauled through a horizontal baler. Instead, they must be manually baled, a more time-consuming process. Even for Christmas trees that are cut, the trees must be baled within several weeks of Christmas because cut trees will hold their needles only for a short time. Concentrating the baling in such a brief span requires more equipment and manpower than if the trees could be baled over a longer period. The result is increased costs of production.

Another drawback of this method is the time and labor it requires to cut and bale the trees and the damage to the trees in the process. Cutting a tree that has its branches fully extended requires considerable effort. Each cut tree must then be hauled through the tree stand to the baler, which because of its size cannot be easily moved between the rows of trees. In the process of hauling the trees, they are often dragged through the mud or over other terrain that can break limbs and brush off needles. The despoiled trees that result are worth much less.

Accordingly, a need remains for an improved tree baling method and apparatus that overcomes the drawbacks of the prior art.

SUMMARY OF THE INVENTION

It is an object of the present invention to provide a tree baling method and apparatus that reduces the damage to trees that results from cutting and hauling them during baling.

It is also an object of the present invention to reduce the labor and time and thus the cost to bale trees.

It is yet another object of the present invention to provide a method for baling a tree in its natural standing state, i.e., in situ.

It is also an object of the invention to provide an apparatus for baling a standing tree in situ.

The foregoing and other objects, features, and advantages of the invention will become more apparent from the following detailed description of two preferred embodiments which proceeds with reference to the accompanying drawings.

BRIEF DESCRIPTION OF THE DRAWINGS

FIG. 3 is a cross-sectional view taken along line 3—3 of FIG. 2.

FIG. 4 is cross-sectional view taken along line 4—4 of FIG. 2.

FIG. 5 is a cross-sectional view taken along line 5—5 of FIG. 2.

FIG. 7 is a top plan view of a portion of the baler of FIG. 6.

FIG. 8 is a top plan view of the baler of FIG. 6.

DETAILED DESCRIPTION

The invention includes a method and apparatus for baling a standing tree in its natural state (in situ). Following are descriptions of two embodiments of the apparatus and a description of the method employed therein.

First Embodiment

Figure 1:
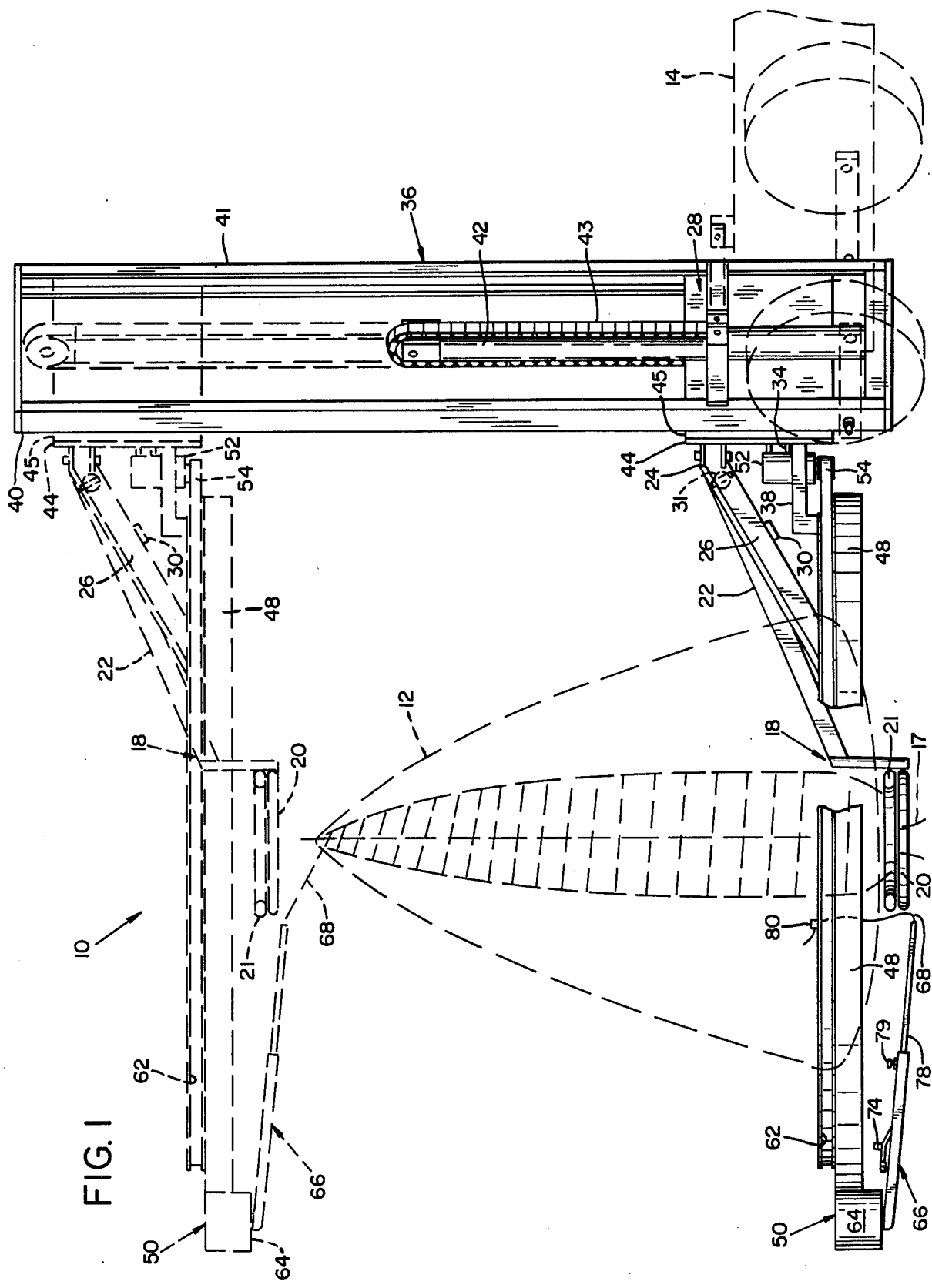
FIG. 1 is a perspective view of a standing tree baler connected to a tractor.
Figure 2:
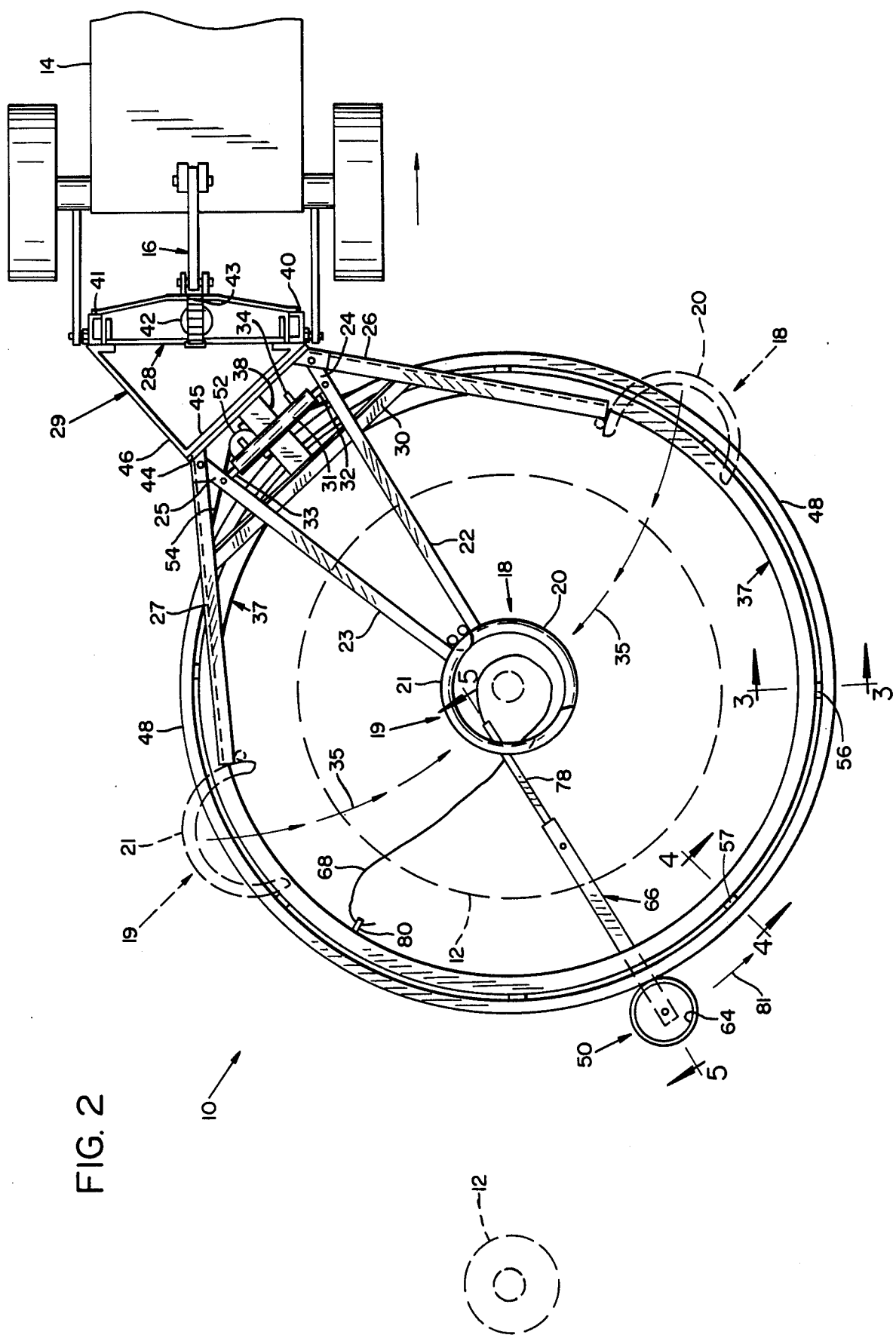
FIG. 2 is a top plan view of the baler.

Referring to FIGS. 1 and 2, a standing tree baler 10 is shown positioned to bale a standing tree 12. The baler is attached to the rear of a tractor 14 by a three-point hitch 16. In use, the baler is hauled behind the tractor as the tractor proceeds between the rows of a tree stand, stopping to center the baler over each tree selected to be baled. The trees are then baled in their natural position, in situ, where they remain until cut or removed for replanting.

The baler 10 includes a collar means for encircling a tree trunk. The collar means is adapted to press the tree branches inward toward the trunk, as it is guided along the trunk by an attached guide means. Securing means associated with the collar means bundles the pressed branches to the trunk.

The collar means is variable in size, being adapted to expand to pass downward over the extended tree branches and to contract below the tree branches to encircle the tree trunk at the handle 17. As best seen in FIG. 2, the collar means comprises a pair of opposed, horizontal yoke members 18, 19 that can be urged apart to straddle the tree 12, as shown in the dotted lines, and can be drawn together into a complete ring slightly larger in diameter than the trunk handle 17. Each yoke member 18, 19 includes a semicircular yoke 20, 21 attached to one end of an arm 22, 23. The other end 24, 25 of each arm 22, 23 is pivotally mounted to an end of a separate support brace 26, 27 each welded to a bracket 29 of a hoist carriage 28. The arms 22, 23 pivot in an angular plane of braces 26, 27 to bring the yokes 20, 21 together in overlapping relationship, as seen in FIG. 2, or to spread the yokes apart, as seen in phantom. When spread apart, the arms 22, 23 slide across a brace 30 underlying support braces 26, 27 to nest in the adjacent brace 26, 27. The nesting retracts the yokes 20, 21 so that they do not brush against the extended branches. The means for controlling the arms' movement is a hydraulic cylinder 31 disposed between them. Opposed rods 32, 33 extend from each end of the cylinder 31 and pivotally connect to each yoke arm 22, 23. A conventional hydraulic pump (not shown) connected to the cylinder by hoses 34 actuates the cylinder 31 to urge the arms 22, 23 apart or bring them together, as shown by the arrows 35.

An inner hoop 37 is attached to guide means, such as a conventional single column forklift hoist 36, by the braces 26, 27 and another elbow brace 38 extending outwardly from the hoist. These braces 26, 27 attach the hoop 37 to the triangular bracket 29 of the hoist carriage 28 that is slidable along mast columns 40, 41. As shown in FIG. 1, the carriage 28 is raised and lowered by hydraulic cylinder 42 operatively connected to the carriage 28 by chain 43. So connected, the carriage 28 can be actuated to raise the yoke members 18, 19 to a height greater than the tree 12 and to lower them to the height of the tree handle 17. The columns 40, 41 of the hoist 36 are substantially vertical so that the yoke members 18, 19 move lengthwise of the tree without engaging the extended branches as the expanded yokes 20, 21 pass downward or without engaging the trunk as the overlapping yokes 20, 21 are raised upward. The hoist 36 is mounted directly to the three-point hitch 16 for ease of use. The triangular bracket 29 angles the collar means over the trees as the tractor 14 drives down a path between tree rows. As shown, the braces 26, 27 are attached to a plate 44 that is secured to the side 45 of bracket 29. The plate 44 can also be secured to the opposing side 46 of the bracket 29 so that the collar means can be centered over trees on the opposite side of the tractor's path.

To bundle the branches to the trunk once they are pressed inward by the yoke members 18, 19, a securing means is connected to the collar means. Referring to FIG. 2, the securing means comprises an outer hoop 48 rotatably mounting hoop 37. A baling twine dispenser 50 attached to the outer arcuate edge 51 of hoop 48 releases twine to wrap the pressed branches to the trunk. The mounting of outer hoop 48 to support hoop 37 is seen in detail in FIGS. 3 and 4. The outer hoop 48 rests on a series of rollers 56, 57 attached to an outer arcuate edge 58 of hoop 37. Each roller 56, 57 alternates in orientation, with bearing surface 59 of roller 56 being horizontal, as in FIG. 3, and bearing surface 60 of roller 57 being vertical, as in FIG. 4. The rollers 56, 57 thus space the outer hoop 48 both radially and vertically from the inner hoop 37. Hoop 48 is rotated by a conventional hydraulic motor 52 mounted on brace 38. The motor 52 is operatively connected to the hoop 48 by a belt 54, which rests within an upper flange 62 on the outer hoop 48. The conventional pump drives the motor.

The attached dispenser 50 rotates with the outer hoop 48 to wrap baling twine around the branches pressed inward to the trunk by yoke members 20, 21. Referring to FIG. 5, the dispenser 50 includes a twine canister 64 and an adjustable feed boom 66 pivotally connected to a bottom turret 67 of canister 64. The boom directs the twine 68 from the canister 64 toward the trunk. The twine 68 is tensioned by a means such as opposed rollers 70, 71 within boom 66 through which the twine passes. Roller 71 is mounted on tensioning rod 72, which is urged toward roller 70 by spring 73. To keep the boom 66 clear of the extended branches as the hoops 37, 48 are lowered, a compression spring 76 is attached to the boom and an inner side 77 of canister 64 to urge the boom tangentially outward. The boom's length may be adjusted to account for the girth of tree 12 by extending or retracting telescoping portion 78, which is held in place by a bolt 79.

The method employed by baler 10 is best seen in FIG. 1. An adjustable tree collar such as yoke members 20, 21 attached to hoop 37 is placed around the tree trunk below the branches. The collar is then raised along the trunk to press the branches inward toward the trunk, as shown in phantom. As the branches are pressed inward, they are bundled to the trunk by twine 68 or other means for securing them in place.

In the method of operation as it is illustrated here, the collar is first centered over the tree as shown in FIGS. 1 and 2. The yoke members 20, 21 are then urged apart to straddle the tree 12 and are lowered by carriage 28 over the tree, preferably to the handle 17. Yoke members 20, 21 are then drawn together around the trunk by the action of the cylinder 31 to encircle the trunk completely. Before the dispenser 50 is actuated, the twine 68 is pulled from the boom and the twine's end placed in a retaining clip 80 mounted on hoop 37. Motor 52 then rotates the hoop 48 to wrap the twine several times around the handle 17 in the direction shown by arrow 81. With the twine now secured, the hoist carriage 28 is raised, causing yoke members 20, 21 to move upwardly along the tree trunk. In doing so, they engage the extended branches and press them inward toward the trunk. Dispenser 50, in its position slightly below the yoke members, releases twine 68 under tension to wrap the pressed branches as boom 66 is pulled inward toward the trunk. When the yoke members 20, 21 pass the top of the tree, as shown in phantom in FIG. 1, the twine 68 is cut and tied off. The baler is then moved to the next tree, in position to be lowered.

Second Embodiment

Figure 6:
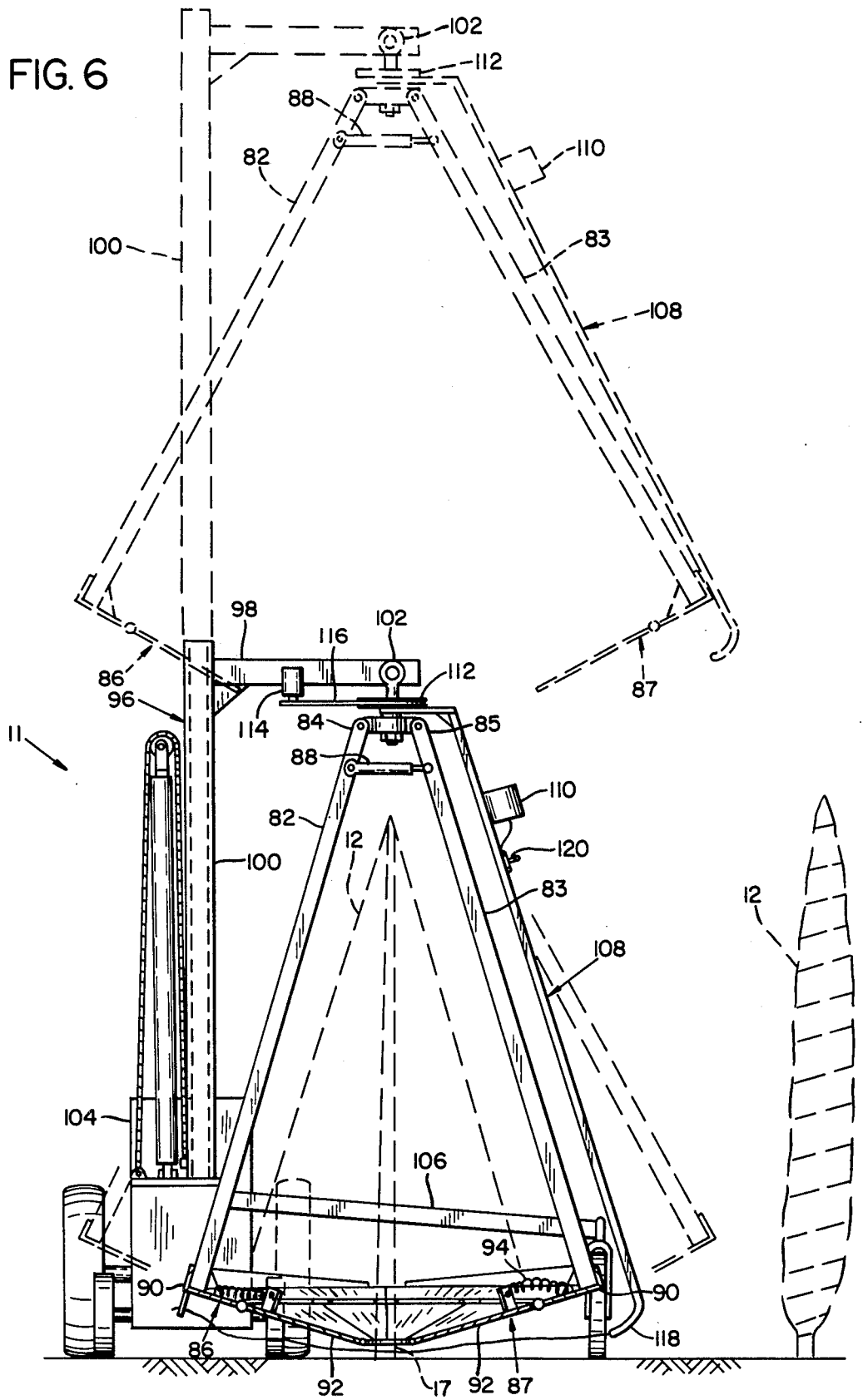
FIG. 6 is a front view of a second embodiment of the baler as it is attached to a tractor.

A second embodiment of a standing tree baler according to the invention is shown in FIGS. 6 through 8. The baler 11 is shown attached to the front of a tractor 14, although it may be attached to the rear as well.

Referring to FIG. 6, the collar means in this embodiment comprises a pair of leg members 82, 83 operatively hinged together at adjacent upper ends 84, 85 and extending the height of the tree 12. A pair of opposed yoke members 86, 87 are connected one each to a lower portion of each leg member 82, 83 and extend inward toward the tree 12 therefrom. Control means such as the hydraulic cylinder 88 is disposed between the adjacent upper ends 84, 85 for urging the legs 82, 83 apart, as shown in phantom in FIG. 6, and for drawing the legs together, as shown in solid lines. The cylinder 88 is actuated by a conventional hydraulic pump (not shown).

Referring to FIG. 7, the yoke members 86, 87 each comprise a crescent-shaped base plate 90 rigidly attached at a right angle to each leg 82, 83 and a number of converging triangular leaves 92 hingedly attached to the inner segmented edge 93 of the plate. Each leaf 92 is held in the plane of plate 90 by a retention spring 94 that permit the leaf 92 to swing only on the upper side of each plate. So constructed, the leaves can be pushed upward and out of the way by the extended branches as the yoke members 86, 87 are lowered over the tree. The leaves 92, however, do not swing past the plane of the plates 90, so that as the yoke members 86, 87 are brought together and raised along the tree trunk, leaves 92 are relatively rigid to press the branches inward toward the trunk.

As shown in FIGS. 6 and 8, the collar means is attached to a conventional hoist 96 by an arm 98 extending outward from a telescoping mast section 100. Mounting bracket 102 attached to the extended end of the arm 98 supports the legs 82, 83. The hoist 96 mounts to the front end 104 of the tractor 14 and is further stabilized by an outrigger wheel 106 attached to the base 107 of the hoist 96.

To bundle the pressed branches, a securing means is shown in FIG. 6 attached to the bracket 102. The means comprises an elongated boom 108 rotatably mounting the legs 82, 83 and a twine canister 110 attached to the boom. A pulley 112 afixed to the top of the boom 108 is operatively connected for rotation to an adjacent hydraulic motor 114 by a belt 116. The boom extends from the pulley 112 along the outside of the leg members 82, 83, hooking inward below them at its lower end 118. The canister 110 feeds twine through the boom 108 and out its lower end for wrapping around the tree trunk. As in the first embodiment, opposed rollers 120 on the boom adjacent canister 110 tension the twine as it is pulled from the canister and wrapped around the branches.

The general method of operation of this embodiment is the same as that employed in the first, differing only in the structure of the baler. With the yoke members 86, 87 centered over the tree 12, legs 82, 83 are urged apart by the hydraulic cylinder 88. The hoist 96 then lowers the legs 82, 83 until the yoke members 86, 87 can be drawn together beneath the extended branches of the tree 12 at the tree handle 17. The legs 82, 83 are next raised by the hoist, causing the yoke members to move upward along the trunk with triangular leaves 92 pressing the branches inward. As this occurs, the boom 108 rotates around the legs 82, 83 to dispense twine beneath the yoke members 86, 87 to wrap the pressed branches and bundle them to the trunk. Once the yoke members 86, 87 pass the top of the tree, as shown in phantom in FIG. 6, the twine is cut and tied.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. An apparatus for baling a tree in situ, the tree including a trunk and branches, comprising:

collar means for encircling a tree trunk, the collar means being adapted to press the branches inward toward the trunk;

guide means attached to the collar means for centering the collar means over the trunk and for guiding the collar means from its centered position along the trunk; and securing means associated with one of the collar means and the guide means for spirally baling the pressed branches to the trunk as the collar means is guided along the trunk.

2. An apparatus as in claim 1, wherein the collar means is variable in size, the collar means being adapted to expand to pass downward over the tree branches and to contract below the tree branches to encircle the tree trunk.

3. An apparatus as in claim 1, wherein the securing means includes a baling twine dispensing means for wrapping baling twine around the pressed tree branches to bundle them to the trunk.

4. The apparatus as in claim 1, wherein the collar means comprises:

support means attached to the guide means;

a plurality of yoke members pivotally mounted on the support means; and control means operatively connected to the yoke members for urging them apart to straddle the tree, and for drawing them together to encircle the trunk.

5. An apparatus as in claim 4, wherein the securing means comprises:

an outer hoop rotatably mounting an inner hoop;

means for rotating the outer hoop; and baling twine dispensing means attached to the outer hoop for wrapping baling twine around the pressed tree branches as the outer hoop rotates.

6. An apparatus as in claim 5, wherein the dispensing means includes a baling twine canister attached to the outer hoop and a feed boom connected to the canister to direct the twine from the canister toward the trunk.

7. An apparatus as in claim 6 wherein the dispensing means includes a tensioning means to tension the twine as it wraps around the tree branches.

8. An apparatus as in claim 6 wherein the boom includes a biasing means to urge it tangentially outward from the trunk of the tree as the boom rotates around the trunk.

9. An apparatus as in claim 1 wherein the guide means comprises a hoist having outwardly extending arms that support and center collar means over the tree to be baled.

10. An apparatus as in claim 1, wherein the collar means comprises:

a pair of leg members operatively hinged together at adjacent upper ends and extending the height of the tree;

a pair of yoke members, one connected to a lower portion of each leg member and extending inward therefrom; and control means connected to each leg member for urging them apart sufficiently for the yoke members to straddle the tree and for drawing them together sufficiently for the yoke members to encircle the trunk.

11. An apparatus as in claim 10, wherein the securing means includes:

a boom rotatably mounting the collar means;

means for rotating the boom around the tree; and baling twine dispensing means attached to the boom for wrapping baling twine around the pressed branches as the boom rotates, the dispensing means feeding baling twine through the boom to the tree.

12. An apparatus as in claim 1 for baling trees planted in rows which further comprises:

positioning means adapted to proceed between the rows of trees for positioning the collar means centrally over the trunk of each tree in a row, whereby rapid repositioning of the apparatus from one tree to the next in the row is facilitated.

13. An apparatus for baling a tree in situ, the tree including a trunk and extended branches, comprising:

adjustable collar means for surrounding the tree, the collar means expandable to pass downward over the extended branches of the tree and contractable to encircle the tree trunk, the collar means being adapted to press the branches inward toward the trunk;

guide means attached to the collar means for centering the collar means over the tree and guiding the means downward over the extended branches and then upward along the tree trunk to press the branches inward toward the trunk; and baling twine dispensing means attached to one of the collar means and the guide means, the dispensing means adapted to rotate around the trunk to wrap baling twine around the pressed branches and thereby bundle the branches to the trunk.

* * * * *